United States Patent [19]

Cook

[11] 4,139,283
[45] Feb. 13, 1979

[54] REAR PROJECTION VIEWER HAVING AUTOMATICALLY ERECTING AUXILIARY SCREEN

[75] Inventor: Gerald H. Cook, Lynnfield, Mass.

[73] Assignee: Polaroid Corporation, Cambridge, Mass.

[21] Appl. No.: 867,016

[22] Filed: Jan. 5, 1978

[51] Int. Cl.² ........................................... G03B 21/10
[52] U.S. Cl. ................................. 352/104; 352/133; 350/123; 353/72; 353/74; 353/76; 353/78
[58] Field of Search ..................... 352/104, 133, 242; 350/123; 353/72, 74, 76, 78

[56] References Cited

U.S. PATENT DOCUMENTS

| 3,791,725 | 2/1974 | Young | 352/129 |
| 3,834,798 | 9/1974 | Bundschuh et al. | 352/104 |

Primary Examiner—Monroe H. Hayes
Attorney, Agent, or Firm—Frederick A. Goettel, Jr.

[57] ABSTRACT

A rear projection viewer apparatus of the type wherein a projected image is projected towards a primary viewing screen which when in its operative viewing position forms the front of the viewer, the front viewing screen being attached to other portions of the viewer housing so that it may be moved to an inoperative position. A second rear projection screen substantially smaller than the first screen is mounted within the viewer housing in a manner where it may be moved from an inoperative position where it does not interfere with projecting to the primary viewing screen to an operative position wherein the images may be projected upon the rear thereof. Means are provided for automatically moving the small auxiliary screen from its inoperative position to its operative position in response to manual displacement of the primary viewing screen from its operative position to its inoperative position.

6 Claims, 5 Drawing Figures

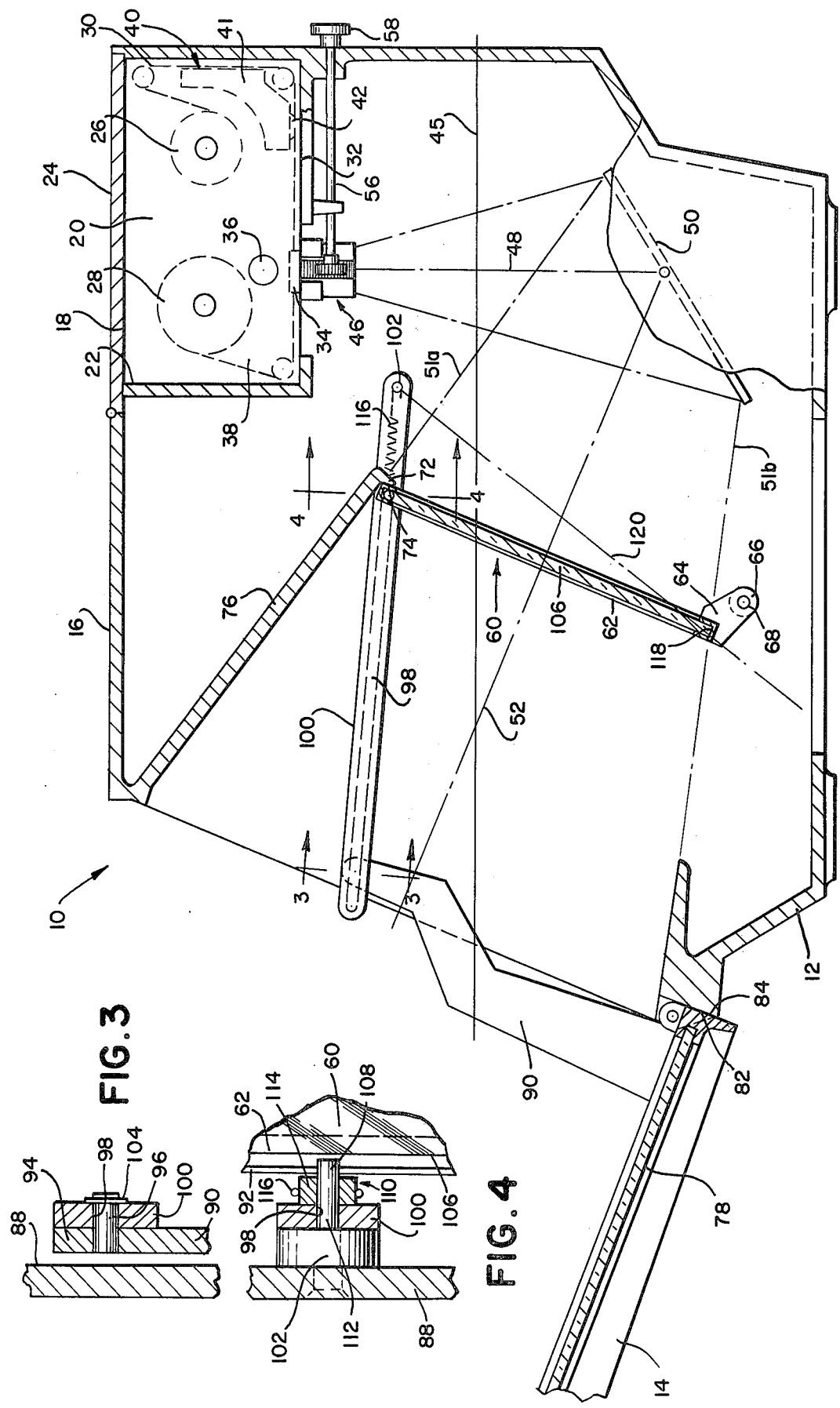

REAR PROJECTION VIEWER HAVING AUTOMATICALLY ERECTING AUXILIARY SCREEN

BACKGROUND OF THE INVENTION

1. Field of the Invention

This invention relates to photographic apparatus and, more particularly, to improved motion picture rear projection viewer apparatus.

2. Description of the Prior Art

Rear projection viewer apparatus in whch the projection system and the viewing screen are combined in a single structural unit are well known in the prior art. Among other advantages, this type of viewer apparatus provides a compact portable unit which permits satisfactory pictorial displays in normal ambient light conditions, and is particularly suited to those instances where available space is limited.

A highly compact, rear projection viewer designed for operation of a motion picture film cassette is described in U.S. Pat. No. 3,701,127 entitled "Projector Apparatus" and assigned to the same assignee as the present invention. The viewer unit described in the above-cited patent provides a highly compact unit employing a lenticulated viewing screen which for reasons of compactness is inclined rearwardly over the base of the apparatus. Inasmuch as the viewing screen is inclined, a screen arrangement is provided which directs transmitted images over a given viewing zone, displaced from the axis perpendicular to the screen. Such a viewing screen is described in U.S. Pat. No. 3,848,980, entitled "Projector Apparatus and System Employing Unique Screen" also assigned to the same assignee as the present invention.

Under some conditions of extemely high ambient light conditions, for example, viewing outdoors on an extremely sunny, bright day, the image on the screen of such a viewer may not be sufficiently bright for good viewing of the images projected thereupon. Also, the viewer/projector of the above-cited patent may be equipped to operate in a portable manner from a 12 volt source such as, for example, through a cigarette lighter outlet on an automobile or a portable battery pack or the like. Under such circumstances, again with probable high ambient light conditions, the illumination available from the 12 volt system may not be sufficient to provide good, bright viewable images under the conditions described.

SUMMARY OF THE INVENTION

In accordance with the present invention, a photographic apparatus for projection of an image recorded on transparent photographic film for viewing of the image is provided. The viewing apparatus comprises a housing defined in part by a first rear projection screen attached to other portions of the housing in a manner permitting it to be manually movable from an operative "viewing" position to an inoperative position. Image-projecting apparatus are provided for projecting an image onto the first screen in a diverging path with the image substantially filling the first screen when it is located at its operative position. A second rear projection screen substantially smaller than the first projection screen is also provided. The second or auxiliary rear projection screen is mounted within the viewer housing in a manner such that it may be selectively located in an operative viewing position wherein the projected image will substantially fill the second screen, or in an inoperative position, also within the viewer housing, wherein the screen does not lie in the projection path to the first screen. Means are provided for moving the auxiliary screen from its inoperative position to its operative position automatically in response to manual movement of the first screen from its operative position to its inoperative position. Similarly, movement of the first screen from its inoperative position back to its operative position will result in movement of the auxiliary screen from its operative position back to its inoperative position within the viewer housing.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of the preferred embodiment when read in connection with the accompanying drawings wherein:

FIG. 2 is a view similar to FIG. 1 showing the apparatus in a condition for viewing on an auxiliary screen;

FIG. 3 is an enlarged fragmentary sectional view of the viewer taken along the line 3—3 of FIG. 2;

FIG. 4 is an enlarged fragmentary sectional view of the viewer taken along the line 4—4 of FIG. 2.

DESCRIPTION OF THE PREFERRED EMBODIMENT

Figure 1:
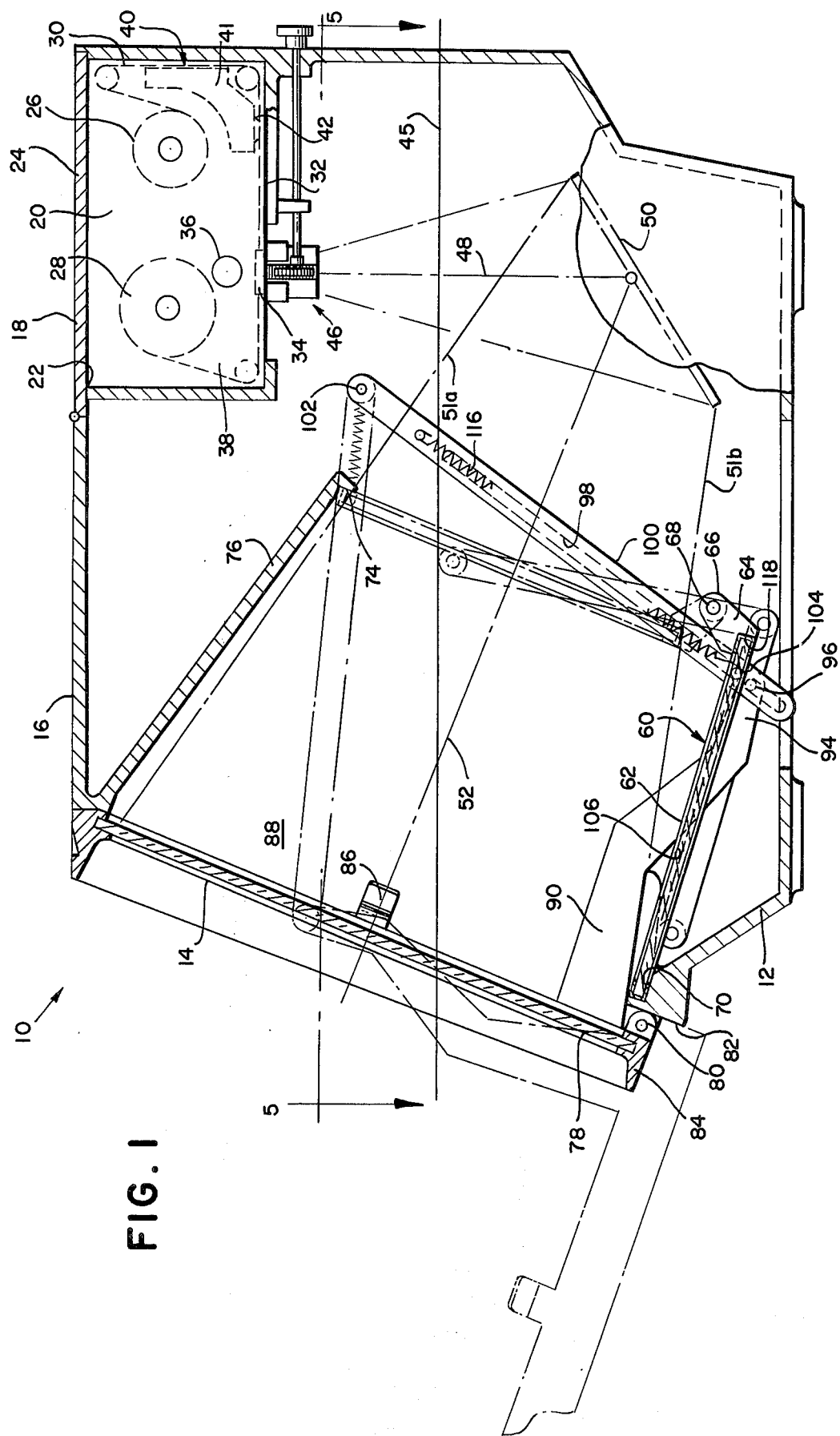
FIG. 1 is a sectional side elevational view of a motion picture viewer, embodying the features of this invention, in a position for viewing in a conventional fashion.

As shown in FIGS. 1 and 2, the photographic apparatus of the present invention preferably takes the form of a rear projection viewer 10 comprising a box-like housing 12 defined in part by a front viewing screen 14. Positioned rearwardly of the screen 14, and in adjoining relation to the top surface 16 of the housing 12 is a cassette receiving well 18 which is adapted to receive a motion picture film cassette 20. The cassette receiving well 18 extends to and is in communication with an opening 22 in the top surface 16 of the housing 12. Pivotally mounted at the forward edge of the opening 22 is a door member 24 for controlling access to the cassette well 18. Hence, the door 24 is mounted for pivotal motion between a closed position as shown in the drawings, blocking the opening 22, and an open position permitting insertion and removal of the cassette 20.

The cassette 20 is a multipurpose motion picture film cassette and may, for example, take the form of the cassette described in U.S. Pat. No. 3,608,455 entitled "System for Processing a Strip of Photographic Material", which is assigned to the assignee of the present invention and which cassette is designed for exposure, processing and projection without removal of its film from the cassette casing. Preferably, the cassette comprises a generally flat parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction through the film 30 and out of the opening 34. For example, in this embodiment, an opening or aperture 36 is provided in one side wall 38 which adjoins the lower edge 32 of the cassette 20, and a reflector element (not shown) such as a mirror or prism, is included within the cassette to redirect the light entering aperture 36, out of the projection station opening 34. Hence, an illumination means (not shown) for example a conventional projection lamp is mounted in the apparatus and in adjoining relation to the aperture 36 so as to suitably direct illumination into the cassette 20. It will therefore be appreciated that the cassette opening 34 serves, in part, to define an exposure station during a first transport of the film 30 thereacross and a projection station during subsequent passes of the film strip thereacross.

Carried within the cassette 20 is a processing station 40, such as described in the aforementioned U.S. patent, which includes a processor 31, designed for selective operation for distribution of an appropriate processing fluid (not shown) over the film 30 during transport of the latter past the dispensing surface or processor nozzle 42, located near the bottom of the processor. In the preferred embodiment, the processor 41 is perpendicular to the plane of the projection station opening 34, and is intended for operation in an upright attitude which facilitates gravitational flow of its fluid to the lower dispensing nozzle 42. Consequently, the well 10 is adapted to locate the cassette 20 in the vertical plane with its projection edge 32 parallel to the longitudinal axis 45 of the viewer 10 and hence, in a horizontal plane.

Included within the housing 12 in adjoining relation to the cassette receiving well 18 are means (not shown) for driving spools 26 and 28 for advancing film 30 across the opening 34. For example, appropriate drive shafts (not shown) are adapted to engage the spools 26 and 28 and suitably rotate them, and a conventional claw arrangement (not shown) is adapted to engage film strip 30 in a conventional manner in the vicinity of the cassette opening 34 so as to progressively advance incremental sections of the film thereacross.

Mounted beneath the cassette receiving well 18 in alignment with the opening 34 is a lens assembly 46, adapted to project an image of the film presented at the opening 34 and focus it at a desired plane at a desired distance from the film 30. As illustrated in FIG. 1, the lens assembly 46 directs an image vertically downward along an optical axis designated as 48 to a reflective means such as a mirror 50, mounted in the path of the axis 48 and at an acute angle thereto so as to redirect the projected image forwardly in a diverging path defined by the light rays 51a, 51b, along an upwardly inclined axis 52 onto the rear of the screen 14. The screen 14 is preferably disposed normal to the axis 52 to reduce pictorial distortion and, as set forth in the above-cited U.S. Pat. No. 3,848,980 it is preferably provided with means for redirecting the viewing axis downwardly to partially offset the upward inclination of the axis 52.

Also included within the apparatus housing 12 are means for focusing the projected images on the screen 14. These means include an arrangement wherein the lens assembly 46 is displaceably mounted for movement along the optical path 48. For example, lens assembly 46 is slideably mounted in a sleeve 49 which is conventially affixed to the bottom 53 of the well 18. A rack 54 is mounted on the lens assembly 46 and is engaged by a pinion gear 55 which is coupled, in turn, to a rod 56. The rod 56 extends through the rear wall 57 of the housing 12 to a focus adjusting knob 58 so as to permit rotation of the knob 58 to alter the focus of the projected images to obtain the desired focus for viewing on the front surface of the viewing screen 14.

Referring now primarily to FIGS. 1 and 2 of the drawing figures, the rear projection viewer 10 of the present invention is further provided with a second, auxiliary viewing screen 60 which is substantially smaller than the primary viewing screen 14. The auxiliary viewing screen 60, as will be described in detail hereinbelow, is mounted within the viewer housing 12 in a manner wherein it may be positioned along the path of the projected image at a location closer to the above-described image projecting system thereby resulting in a smaller, yet brighter image on the smaller screen for facilitating viewing of the image under higher ambient light conditions. FIG. 1 illustrates the viewer 10 with the primary screen 14 in its "operative" position and the auxiliary viewing screen 60 in its "inoperative" position within the viewer housing. It will be seen that the inoperative position of the auxiliary screen 60 lies out of the diverging path of the projected image defined in part by the light rays 51a and 51b thereby permitting unimpaired projection of the image upon the rear of the primary screen 14 with the viewer in such condition. FIG. 2 illustrates the primary viewing screen 14 in its "inoperative" position, and similarly, the auxiliary viewing screen 60 in its "operative" position where it is in a position to receive the entire image projected by the image projecting system for viewing thereon.

The above-described "operative" and "inoperative" positions of the two viewing screens 14, 60 will be used in describing the mechanical linkage system provided in the viewer of the present invention for automatically erecting the auxiliary screen 60 to its operative position upon movement of the primary screen 14 from its operative position to its inoperative position.

Referring now to FIG. 1, it will be seen that the auxiliary viewing screen 60 is carried in a structural mounting frame 62 which extends about and receives each of the four sides of the auxiliary screen. The mounting frame 62 is provided with a structural offset arm extension 64 at its lower end which, in turn, is suitably mounted to a structural portion 66 of the viewer housing 12 to facilitate rotational movement of the auxiliary screen 60 and its frame 62 about an axis 68, through the mounting point, substantially perpendicular to the upwardly and forwardly extending axis 52 of the projection path. Accordingly, the auxiliary screen 60 in its inoperative position is supported by the rotatably mounted offset arm 64, and by a supporting ledge 70 forming a part of the structure of the viewer housing 12 and extending substantially the full width of the auxiliary screen 60. Looking at FIGS. 1 and 2, without reference to the other linkages of the auxiliary screen erecting system, it will be seen that the auxiliary screen 60 and its supporting frame 62 if not engaged by the other members of the system, could be manually rotated from its inoperative position of FIG. 1 upwardly and rearwardly to its operative position of FIG. 2 with the rearwardly facing portion of the upper end of the auxiliary screen frame 62 resting against auxiliary screen supporting abutment 74 integrally formed at the end of an interior wall portion 76 of the viewer housing 12. It should be appreciated that an identical auxiliary screen offset mounting arm 64 is provided on both the left and right hand sides of the screen frame 62. Similarly, the auxiliary screen erecting linkages which will now be described in detail comprise an identical set of linkages on both the left and right hand sides of the viewer 10. As viewed in FIGS. 1 and 2, the linkages on the left hand side of the housing 12 as viewed forwardly of the primary viewing screen 14 are illustrated in the drawing figures. Accordingly, these linkages lie behind the auxiliary screen 60 as viewed in FIGS. 1 and 2.

Still referring to FIGS. 1 and 2, the primary viewing screen 14 of the viewer 10 is mounted in an outer perimeter frame 78 which, together with the screen 14 itself, substantially define the front face of the viewer housing 12. The main viewing screen frame 78 is pivotally mounted at its lower end to a suitable structural portion 80 of the viewer housing 12 to facilitate rotational movement in a forward and downward direction from its operative position shown in FIG. 1 to its inoperative position shown in FIG. 2. The viewer housing 12 is provided with a suitable structural abutment 82 which engages the lower end 84 of the main screen perimeter frame 78 when the screen 14 and frame 78 are in the inoperative position to thereby support the screen in that position, as seen in FIG. 2. Referring to FIG. 1, the main screen support frame 78 is provided with deflectable retaining clips 86 on at least its two lateral sides 88 which are adapted to engage suitable restraining structure (not shown) provided in the interior wall 90 of the viewer housing 12 which serve to retain the primary viewing screen 14 and its mounting frame 78 in its operative position for normal viewing on the primary screen 14.

Figure 5:
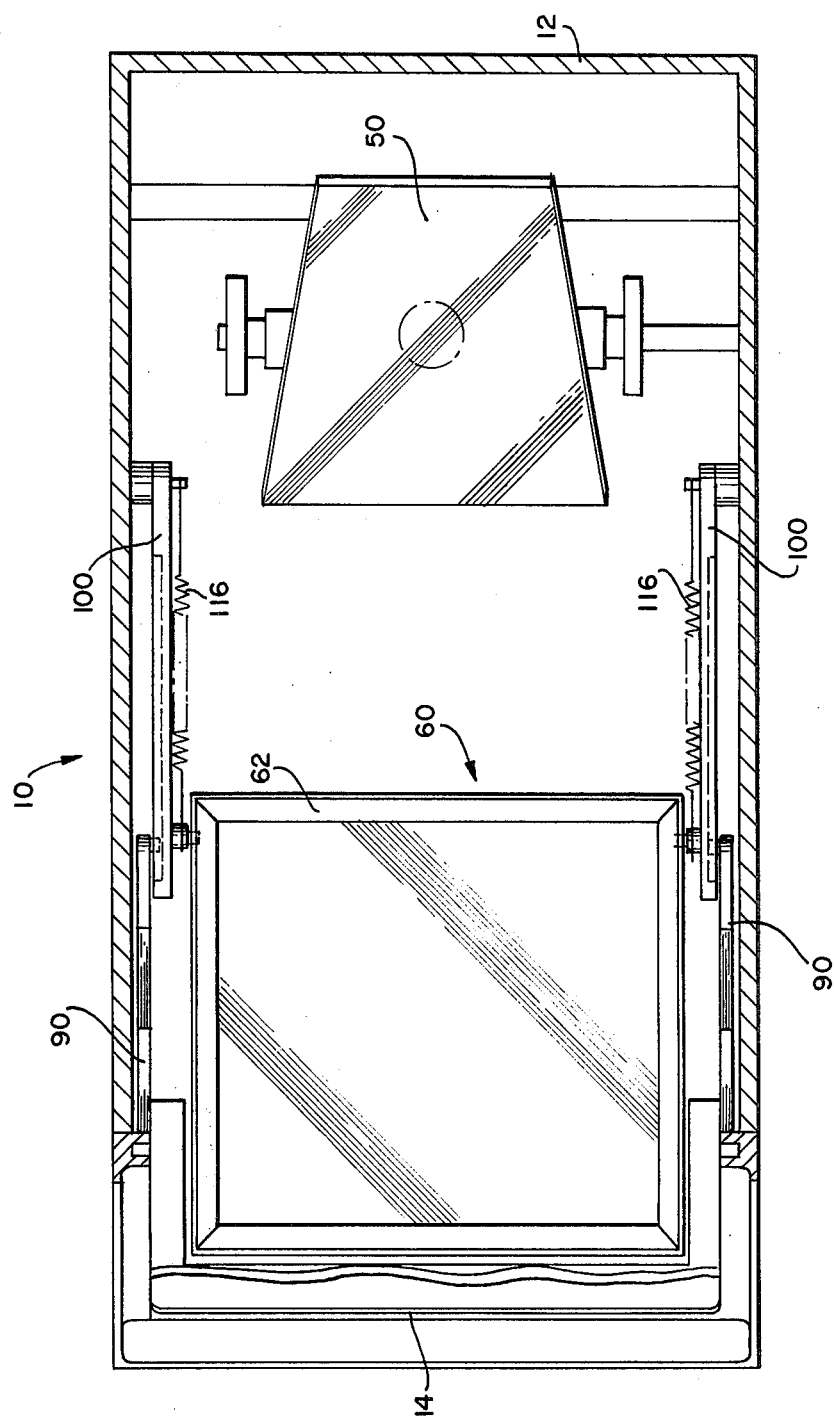
FIG. 5 is a sectional view taken along the line 5—5 of FIG. 1.

Again referring to FIGS. 1 and 2 and also to FIG. 5, the primary screen supporting frame 78 is provided with a pair of integrally formed structural actuating arms 90 which extend from the lower ends of the right and left hand sides of the frame 78 to a position interiorly of the viewer housing 12 adjacent the opposing lateral edges 92 of the auxiliary screen supporting frame 62. As illustrated in FIG. 3, each of the actuating arms 90 is provided at its innermost end 94 with a pin element 96 which is adapted to pass through and slidingly engage elongated slots 98 provided in a pair of elongated screen erecting links 100. Each of the screen erecting links 100 is pivotally mounted at a location 102 within the viewer housing 12 above the image projection path. The pins 96 are provided with suitable restraining lock nuts 104 or the like to thereby retain the pins within the screen erecting members slots 98 in a manner permitting relative rotational and translational movement of the pins 96 within their respective slots 98.

The above-described relationship between the actuating arms 90 carried by the primary screen frame 78 and the auxiliary screen erecting link 100, it should be evident from the drawings, will result in movement of the respective members from the positions in which they are shown in FIG. 1 to their relative positions illustrated in FIG. 2, upon movement of the primary screen 14 to its inoperative position.

Referring now to FIG. 4, it will be seen that the lateral edges 92 of the auxiliary screen mounting frame 62 are each provided with a groove 106 which extends substantially along the entire length of the lateral edges 92. This groove 106 is sized to slidingly receive one end 108 of a double headed pin member 110 which member serves, as will be seen hereinbelow, to interconnect the auxiliary screen frame 62 with the screen erecting link 100. The other pin or end 112 of the interconnecting element 110 extends into sliding engagement with the elongated slot 98 of the erecting link 100. Each of the above-described pins 108, 112 of the interconnecting member 110 is free to translate along the length of their respective receiving groove 106 and slot 98 of the screen frame 62 and the screen erecting member 100. A hub or a spacer element 14 forming the intermediate section of the interconnecting member 110 serves to maintain the screen erecting link 100 and the screen frame 62 in the spaced relationship illustrated in FIG. 4. A helper spring 116, for assuring retention of the auxiliary screen 60 in its operative position shown in FIG. 2 is attached to the spacer portion 116 of each of the interconnecting members 110 and extends to and is suitably attached at the fixed pivot point 102 of the screen erecting link 100.

Accordingly, it should be appreciated that the relationship between the linkages described hereinabove will result in forwardly and upwardly movement of the erecting link 100 to the position illustrated in FIG. 2 upon movement of the primary screen 14 and its frame 62 to its inoperative position. Likewise, during such movement of the primary screen 14, the interconnecting element 110 between the screen erecting link 100 and the grooves 106 provided in the lateral edges 92 of the auxiliary screen mounting frame 62 will translate relative to the link 100 and screen frame 62 in a manner resulting in pivotal movement of the auxiliary screen 60 from its inoperative position shown in FIG. 1 to its desired operative position of FIG. 2 with the helper spring 116 serving to maintain the rear surface 72 of the upper edge of the auxiliary screen mounting frame 62 in abutment with the stop 74 provided therefor. Accordingly, with the auxiliary screen 60 in its operative position as shown in FIG. 2, the projected image will be projected upon the back side of the auxiliary viewing screen 60 thereby permitting viewing of the projected images from a location forwardly of the viewer housing 12. Adjustment of the lens assembly focusing knob 58 will result in proper focus of the projected images for good viewing upon the auxiliary screen 60.

Following erection of the auxiliary viewing screen 60, when it is desired to again use the primary viewing screen 14, all that is necessary is to manually displace the primary screen 14 from its inoperative position back to its operative position, and the auxiliary viewing screen 60 will automatically return to its stored inoperative position within the viewer housing. Referring to FIG. 2, it will be seen that upon movement of the primary viewing screen 14 from its inoperative position, the actuating arms 90 and the screen erecting links 100 will together rotate downwardly. During the initial downward rotation of these elements the interconnecting elements 110 will each slide downwardly in the lateral grooves 106 of the auxiliary screen mounting frame 62. When the interconnecting elements 110 reach the bottom 118 of the grooves 106, that is, when the screen erecting link 100 is in a position substantially concident with the phantom line 120 shown in FIG. 2, the pins 108 engaging the lateral grooves 106 of the screen frame 62 will bottom out in the groove at a position offset from the rotational axis 68 of the screen mounting frame 62 and continued downward rotation of the screen erecting link 100 will result in a force acting through a moment arm substantially equal to the distance from the bottom 118 of the groove 106 to the axis 68 thereby causing the auxiliary screen 60 to rotate forwardly against the force of the helper spring 116, and continued downward rotation of the erecting link 100 will force the auxiliary screen 60 and its mounting frame 62 to continue rotating forward to its inoperative storage position as shown in FIG. 1.

Accordingly, it should be appreciated that the viewing apparatus described hereinabove provides for a rear projecting viewing system wherein the projected image may be viewed upon a large primary viewing screen under substantially normal ambient lighting conditions and also includes a smaller rear projection viewing screen which may be automatically erected within the viewer housing upon rotating the primary viewing screen out of the path of the projected image. The small screen results in a brighter image thereby facilitating viewing of the projected image under substantially higher ambient lighting conditions. In addition, the portion of the viewer housing extending forwardly of the erected auxiliary screen serves as a light shield or hood to further enhance the brightness of the image of the auxiliary screen.

It should be understood that this invention may be practiced or embodied in still other ways without departing from the spirit or essential character thereof. Hence, the preferred embodiment herein is illustrative and not restrictive, the scope of the invention being indicated by the appended claims and all variations which come within the meaning of the claims are intended to be embraced therein.

What is claimed is:

1. Photographic apparatus for projection of an image of given size recorded on transparent photographic film for viewing thereof, said apparatus comprising:
   a housing defined in part by a first rear projection screen, said first rear projection screen being attached to other portions of said housing in a manner such that it is manually movable from an operative position to an inoperative position;
   image projection means, including a projection lamp and lens assembly, mounted within said housing for projecting the image onto said first screen in a diverging path at least in part along an axis substantially normal to said first screen with the image substantially filling said first screen when located at its said operative position;
   a second rear projection screen substantially smaller than said first screen, said second screen being mounted within said housing in a manner such that it may be selectively located in an operative position substantially normal to said axis and at a location therealong substantially closer to said image projecting means than said first rear projection screen when it is at its said operative position, with the projected image substantially filling said second screen, or in an inoperative position also within said housing wherein it does not lie in said diverging path; and
   means for moving said second screen from its said inoperative position to its said operative position responsive to said first screen being moved from its said operative position to its said inoperative position and for moving said second screen from its said operative position to its said inoperative position responsive to said first screen being moved from its said inoperative position to its said operative position.

2. The apparatus of claim 1 wherein said first screen provides a front surface of said housing when in its said operative position and wherein said first screen is pivotally mounted at its lower end to said other portions of said housing so that it may be pivoted forwardly and downwardly with respect to said housing to its said inoperative position, said inoperative position lying in a plane substantially normal to a plane passing through said first screen's operative position.

3. The apparatus of claim 1 wherein the lower end of said second screen, with respect to its said operative position, is pivotally mounted to interior housing structure in a manner such that it may be rotated from its said operative position forwardly and downwardly with respect to said housing to its said inoperative position within said housing, said inoperative position lying under said diverging path of said projected image.

4. The apparatus of claim 2 wherein the lower end of said second screen, with respect to its said operative position, is pivotally mounted to interior housing structure in a manner such that it may be rotated from its said operative position forwardly and downwardly with respect to said housing to its said inoperative position within said housing, said inoperative position lying under said diverging path of said projected image.

5. The apparatus of claim 4 wherein said means for moving said second screen comprises an elongated screen erecting link pivotally mounted within said housing at a location rearwardly of the upper end of said second screen, with respect to said second screen's operative position, said mounting of said screen erecting link permitting pivotal rotation of said link about an axis parallel to the axis of rotation of said second screen, and, means for interconnecting said screen erecting link with said second screen, said means for interconnecting engaging each of said screen erecting link and said screen in a manner permitting relative rotational movement and translational movement of said interconnecting means with each of said other elements, the relative geometry of said screen erecting link, said second screen and said interconnecting means being such that rotational movement of said screen erecting link between a first position and a second position within said viewer housing results in corresponding movement of said second screen between its inoperative and its operative position respectively.

6. The apparatus of claim 5 further comprising a screen actuating arm integrally formed with said first rear projection screen and extending from the rearwardly facing portion thereof into the interior of said viewer housing and terminating in a configuration adapted to positively engage said screen erecting link and permitting rotational and translational movement therebetween, said actuating arm being adapted to engage said screen erecting link in a manner whereby said screen erecting link is moved from its said first position to its said second position when said first screen is moved from its said operative position to its said inoperative position, whereby said second screen will be caused to move from its said inoperative position to its said operative position in response to movement of said first screen from its said operative position to its said inoperative position.

* * * * *